| United States Patent [19] | [11] | 4,272,588 |
|---|---|---|
| Yoldas et al. | [45] | Jun. 9, 1981 |

[54] OXIDE PROTECTED MIRROR

[75] Inventors: Bulent E. Yoldas, Churchill; Arthur M. Filippi, Mt. Lebanon; Raymond W. Buckman, Jr., Pleasant Hills, all of Pa.

[73] Assignee: Westinghouse Electric Corp., Pittsburgh, Pa.

[21] Appl. No.: 69,214

[22] Filed: Aug. 23, 1979

[51] Int. Cl.³ .................... B05D 3/02; G02B 1/10; G02B 5/08

[52] U.S. Cl. .................... 428/433; 427/162; 427/164; 427/165; 427/166; 427/167; 428/434; 428/472; 204/192 C

[58] Field of Search ............... 427/162, 164, 165, 166, 427/167, 160; 428/433, 434, 472; 204/192 C

[56] References Cited

U.S. PATENT DOCUMENTS

| 2,584,905 | 2/1952 | Moulton et al. | 106/287 |
| 2,689,858 | 9/1954 | Boyd | 260/429 |
| 2,710,267 | 6/1955 | Boyd | 117/121 |
| 2,768,909 | 10/1956 | Haslam | 117/121 |
| 3,094,436 | 6/1963 | Schroder | 117/215 |
| 3,460,956 | 8/1969 | Dahle | 106/287 |

Primary Examiner—James R. Hoffman
Attorney, Agent, or Firm—R. D. Fuerle

[57] ABSTRACT

A mirror is made by applying a coating to a highly reflective surface of a substrate. The coating is prepared from a composition of an alkoxide having the general formula $M(OR)_n$, where M is 0 to 100% titanium, 0 to 25% silicon, 0 to 100% tantalum, or 0 to 15% of a metal ion which forms an alkoxide, R is alkyl from $C_1$ to $C_6$ and n is the valence of M, about 1.7 to about 8 moles of water per mole of alkoxide, sufficient alcohol to give a solids content of about 0.5 to about 15%, and a sufficient amount of a suitable acid to prevent cloudiness. The coated substrate is fired at about 200° to about 600° C. to form an oxide coating which is substantially oxygen impervious. Additional layers of the coating may be applied and fired until the oxide coating is about 200 to about 5000Å thick, avoiding quarter-wave thicknesses.

15 Claims, No Drawings

OXIDE PROTECTED MIRROR

BACKGROUND OF THE INVENTION

Mirrors can be made by depositing chemically or by vapor deposition thin films of metals onto a substrate such as a glass surface. The metal films must be protected, however, for otherwise they lose their reflectivity within a very short period of time due to oxidation and attack by atmospheric pollutants. The glass protects one side of the film and the other side is usually overcoated with, for example, copper, and then painted to protect the metal film.

In solar energy conversion large numbers of mirrors are employed in heliostats. As this technology is rapidly developing, there are considerable additional demands on the durability and reflectivity of these mirrors. It would be desirable, for example, to use front surface mirrors rather than the usual back surface mirrors to reduce energy loss through the glass plate. Another advantage of the front surface mirror is that the substrate beneath the surface need not be of high quality plate glass. Any suitable material, even metals and plastics, could be used, permitting significant cost savings. The use of front surface mirrors, however, requires protection of the highly reflective metallic surface from oxidation and environmental pollutants by means of a transparent coating. At the present time, magnesium fluoride coatings are used on front surface mirrors, but these mirrors are very expensive.

SUMMARY OF THE INVENTION

We have discovered that titanium oxide and certain other oxides can be applied from alkoxide solutions to highly reflective surfaces to form a mirror. Although the alkoxide based solutions and the preparation of oxide coatings from them was known (see U.S. patent application Ser. No. 931,346) we have found that coatings can be made from these alkoxide derived solutions at the low temperatures which are required to prevent the destruction of reflective metallic films used to form mirrors. We have also found conditions under which these metallic oxide coatings will not interact with the metallic films used in the mirrors. The use of these coatings to protect the highly reflective metal film surfaces permits the production of front surface mirrors at substantial cost savings. The production of inexpensive front surface mirrors is expected to substantially improve the competitive position of the solar energy industry.

PRIOR ART

U.S. patent application Ser. No. 931,346, filed Aug. 8, 1978 by Bulent E. Yoldas, entitled "Polymerized Solutions For Depositing Optical Oxide Coatings," abandoned in favor of continuation application Ser. No. 65,706, filed Aug. 10, 1979. discloses the formation and application of alkoxide solutions to form an anti-reflective oxide coating on the solar cells. The instant application uses the same alkoxide derived solutions and a similar method of applying them to form oxide coatings.

DESCRIPTION OF THE INVENTION

In this invention a mirror is prepared by forming an oxide coating on a highly reflective surface on a substrate. The highly reflective surface is preferably a metal, preferably aluminum or silver as they are the most reflective metals, although stainless steel and other metals could also be used. The substrate merely supplies support for the metal film and can be almost any material which is compatible with the film and is coatable by the film such as steel, plastic, or glass. The substrate and the metal film can be integrated into a single material, for example if a substrate of aluminum is used with a highly polished surface which forms the metal film. The preferred substrate, however, is glass, as it is inexpensive and forms a uniform and very smooth surface to which the metal film can be applied. The metal films can be applied to the substrate by any suitable technique such as chemically or by vapor deposition as is known in the art.

The oxide coatings which protect the film are deposited from a solution derived from metal alkoxides, as is taught in application Ser. No. 931,346. Alkoxides useful for forming these coatings have the general formula $M(OR)_n$. In the formula (M) represents a metal ion. This ion is preferably titanium, as it is commercially the most important and forms the hardest coatings, but it can also be tantalum. Lesser amounts of other alkoxides can be included, but they may lower the protective capability of the coating. For example, up to 25% (all percentages herein are by weight) of the M ion content can be silicon or up to 15% of the M ion content can be another M ion that forms a compatible alkoxide, such as boron, aluminum or zirconium. The (n) in the formula is the valence of the M ion and can vary from 3 to 5. The R group is alkyl from $C_1$ to $C_6$. Each R group may be independently selected, if desired, though they are usually the same. The R group is preferably ethyl, isopropyl, or butyl, because these alkoxides are commercially available and inexpensive. Also, the alcohols which are formed from these alkyl groups mix with water in the range of the invention. The alcohol used in preparing the coating solutions can be any liquid alcohol, though ethanol is preferred as it is inexpensive. Higher alcohols produce thicker films. The alcohol need not be the same alcohol that is produced by the hydrolysis of the alkoxide, and in some instances it is desirable that they be different in order to obtain different viscosities. The amount of alcohol should be sufficient to produce a solution having a solids content of about 0.1 to about 15% based on equivalent $TiO_2$. Any greater solids content for the same degree of hydrolysis will cause the solution to gel, and a lesser solids content results in undesirably thin coatings. The preferred solids content is about 2 to about 8% based on equivalent $TiO_2$. Stated another way, the preferred maximum is about 1 mole alkoxide per liter of final solution. Metal alkoxides, in general, hydrolyze quite vigorously when brought into contact with water, forming oxides and hydroxides as represented by the equations:

$$M(OR)_n + nH_2O \rightarrow M(OH)_n + nR(OH) \quad (1)$$

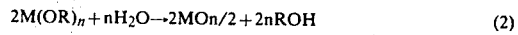

$$2M(OR)_n + nH_2O \rightarrow 2MO_{n/2} + 2nROH \quad (2)$$

Whether the oxide or the hydroxide forms during the hydrolysis depends on the nature of the alkoxide. In either case, however, the resultant material is particulate, precipitates out, and therefore is not useful for coating. The alkoxides of titanium and tantalum, particularly, form precipitates even under insufficient water hydrolysis, and the formation of precipitates cannot be prevented under normal conditions. But precipitate formation and self-condensation which would normally occur during the hydrolysis of these alkoxides are prevented from occurring by a careful control of molecular interaction during the hydrolysis where certain amounts of (OR) groups are left in the molecular structure. This is done by controlling first, the amount of water and dilution of the system, and second, by the presence of a critical amount of certain acids.

Because the water and/or alkoxide is diluted by the alcohol, the interaction of alkoxide and water molecules are reduced to a critical amount where the complete hydrolysis of an alkoxide molecule cannot take place, occurrence of which would precipitate $TiO_2$. The first reaction produces a partially hydrolyzed alkoxide which does not precipitate:

$$Ti(OR)_4 + H_2O \rightarrow Ti(OR)_3OH$$

The partially hydrolyzed alkoxide molecules include $Ti(OR)_2(OH)_2$ and $Ti(OR)(OH)_3$, and can then form a polymer with other alkoxide molecules.

$$(RO)_3Ti-OH + RO-Ti(OR)_3 \rightarrow (RO)_3Ti-O-Ti(OR)_3 + ROH$$

which can again react with other partially hydrolized titanium species. Because of the alkyl groups in the polymer it remains soluble in the alcohol. To keep the polymer soluble, it is necessary that not all the alkoxide bonds be hydrolyzed. Thus, the amount of water added is absolutely critical. If the amount is less than 1.7 moles of water per mole of alkoxide the coatings may be permanently cloudy and if more than 8 moles of water per mole of alkoxide is used, the solution will gel fairly quickly. Preferably, the amount of water should be 1.8 to 2.2 moles per mole of alkoxide.

In preparing the solution it is important to avoid contacting alkoxide with water without diluting one or both of them with alcohol first for otherwise a precipitate will form at the point of contact. Although either or both the water and alkoxide can be diluted with alcohol first, it is preferable to dilute the water, then to mix the water-alcohol mixture with the alkoxide. There should be a minimum of 600 cc. of alcohol used per mole of alkoxide; the preferable diluting range however is 2 to 8 liters of alcohol per mole of alkoxide.

When water and the alkoxide are brought into contact in an alcohol diluted system, the system turns cloudy. We have found that this cloudiness, which indicates condensation of separate particles, can be totally avoided by introducing at least 0.014 moles of either $HNO_3$ or $HCl$ acids as heretofore described. If the introduction of acid is made into the water-alcohol solution before mixing with the alkoxide no cloudiness ever occurs, and this is therefore the preferred method of introducing the acid. Acid can be added anytime after the mixing occurs and it will cause the cloudy slurry to turn into a clear solution. However, if more than 0.1 moles of acid are used per mole of alkoxide, the solubility of the solution is reduced and it will turn cloudy after several days. So far, no organic acids have been found which work, and the only inorganic mineral acids which have been found to work are hydrochloric acid and nitric acid, although not all acids have been tried.

The solution, once prepared, should be aged for a few hours to permit the polymerization to proceed and stabilize. The solution should be clear at this stage. A clear solution indicates that a single continuous phase has been made rather than a particulate suspension or a precipitate. (A gel cannot be dissolved by adding solvent.) To make a coating from the solution, it is first applied to a substrate. Application may be by spraying, painting, spinning, or other suitable method but dipping is the preferred method as it is most easily adapted to mass production.

Unlike the optical antireflective films the thickness of the coating should not have to meet quaterwavelength requirement. Therefore, there is considerable flexibility as to the thickness. On the other hand, the antireflective films taught by patent application No. 931,346 do not have to be dense, whereas density and lack of porosity to corrosive substances is very important in this application. It is observed that the $TiO_2$ solution described in patent application No. 931,346 meets two requirements that are essential to the success of applying a protective coating. First, because the coating may be applied at very low temperatures the assurance of undesirable thermal reactions between the reflective metallic surface and the coating or environment is prevented. Secondly, it was found that, unlike other oxide coatings similarly deposited, the $TiO_2$ coating is either denser at these low temperatures or its porosity is such that no penetration of external corrosive agents can take place, and for this reason $TiO_2$ coatings are preferred. This property of the $TiO_2$ film is in addition to the excellent natural resilience of titanium oxide material.

The coating is preferably about 200 to about 5000 Å in thickness, as thinner coatings may be damaged and thicker coatings may absorb too much light and may flake off due to differences in thermal expansion between the coating and the metal film. However, thicker or thinner coatings can be used if desired. A most preferred thickness is about 1000 to about 3000 Å. If the coating is on a front-surface mirror, however, it should not be of a thickness, such as one-quarter wavelength, that will make the coating antireflective. After the substrate has been coated it is heated to at least 200° C. to drive off solvent and organics and form inorganic metal oxide polymer. While a protective film is formed at 200° C., a temperature of at least about 300° C. is necessary to drive off all organics and form a film which is entirely metal oxide. The film resulting after the heat treatment is continuous, has a uniform thickness within several Angstroms, and is tenaciously bonded onto the substrate. Repeated applications of the alkoxide coating and firings of the coating may be necessary to bring the resulting oxide coating up to the desired thickness. The baking is preferably done under vacuum or in a non-oxidizing atmosphere such as nitrogen to protect the metal film from attack by oxygen and also because a denser and a better quality coating seems to form. Vacuum or an inert atmosphere also permits a higher temperature heat treatment which is beneficial under certain conditions. The invention may be used to form either front surface mirrors or back coated mirrors (termed "second surface" mirrors) but is is most advantageous for forming front surface mirrors as few other inexpensive techniques are available for producing these mirrors. The resulting oxide coatings are transparent, but some coatings may be reflective of ultraviolet light, which is a further advantage when the mirrors are used to form heliostats.

The following examples further illustrate this invention.

EXAMPLE 1

A 3.5 weight percent equivalent of a TiO$_2$-containing polymerized solution was prepared by the teachings of patent application No. 931,346 as follows. First, 3 g. H$_2$O were added to 180 g. dry ethyl alcohol, C$_2$H$_5$OH, and 8 drops of HNO$_3$. The mixture was stirred well and 20 g. titanium ethoxide, Ti(OC$_2$H$_5$)$_4$, were introduced. The composition was stirred and allowed to stand several hours. Samples of commercial mirror 3"×3" were prepared by cutting it from a large commercial mirror and removing the back paint with solvents. One-half of each sample was dipped in the precursor titanium solution. All the samples were baked at 250° C. in air and 250° C. and 400° C. in vacuum to produce oxide films estimated to be about 1000 Å thick on the coated samples. (Commercial mirrors are degraded at 400° C. in air). After baking, the samples were examined and were etched in 10% nitric acid. It was observed that the coated portion of the samples showed excellent resistance to the acid, but the uncoated parts were completely etched. Inspection of the back surface of the mirrors indicated that during the heat treatment in air the uncoated portion of the copper backing was completely oxidized whereas the coated portion showed no signs of oxidation.

EXAMPLE 2

Aluminum films 2000 Å thick were deposited by sputtering on 3"×3" pieces of plate glass ⅛ inches thick. One-half of each sample was dipped in the solution described in Example 1. Some of the samples were baked in air and some in vacuum at 400° C. producing coatings about 1200 Å thick on the coated samples. They were then etched in a saturated sodium hydroxide solution. It was found that the air firing up to 400° C. was not as detrimental to the aluminum film as it was to the silver whether or not it was coated. Also, TiO$_2$ coated parts of the mirror showed no observable reaction with the sodium hydroxide solution whereas the uncoated parts were completely etched off.

EXAMPLE 3

Silver films 2000 Å thick were deposited by sputtering on 3"×3" pieces of glass plates ⅛ inches thick. One-half of the samples were dipped in the TiO$_2$ solution described in Example 1. All the samples were baked at 250° C. in vacuum producing coatings 600 Å thick on the coated samples. The coated samples were then etched in a 10% solution of nitric acid. The uncoated portions of the samples were etched away but the coated portions remained intact.

We claim:

1. A mirror comprising
   (A) a highly reflective surface on a substrate; and
   (B) a metal oxide coating that is substantially oxygen impervious on said surface, said metal oxide being selected from the group consisting of 0 to 100% of a titanium oxide, 0 to 25% of a silicon oxide, 0 to 100% of a tantalum oxide, and 0 to 15% of a metal oxide of an alkoxide-forming metal.

2. A mirror according to claim 1 wherein said metal oxide is about 100% of a titanium oxide.

3. A mirror according to claim 1 wherein said surface is selected from silver and aluminum and said substrate is glass.

4. A mirror according to claims 1 or 3 wherein said reflective surface faces away from said substrate.

5. A mirror according to claim 1 wherein said oxide coating is about 200 to about 5000 Å thick.

6. A mirror according to claim 5 wherein said oxide coating is about 1000 to about 3000 Å thick.

7. A method of making a mirror comprising
   (A) coating a highly reflective surface of a substrate with a composition which comprises
      (1) titanium alkoxide having the general formula Ti(OR)$_4$, where R is alkyl from C$_1$ to C$_6$;
      (2) about 1.7 to about 8 moles of water per mole of alkoxide;
      (3) sufficient alcohol to give a solids content of about 0.1 to about 15%, and
      (4) a sufficient amount of a suitable acid to prevent cloudiness;
   (B) firing said coated substrate at about 200° to about 600° to form an oxide coating which is substantially oxygen impervious,
   (C) repeating steps (A) and (B), as necessary, until said oxide coating is of a desirable thickness.

8. A method according to claim 7 wherein said oxide coating is about 200 to about 5000 Å thick.

9. A method according to claim 8 wherein said oxide coating is about 1000 to about 3000 Å thick.

10. A method according to claim 7 wherein said oxide coating is about 100% titanium oxide.

11. A method according to claim 7 wherein said surface is selected from silver and aluminum and said substrate is glass.

12. A method according to claim 7 wherein said reflective surface faces away from said substrate.

13. A method according to claim 7 wherein said firing is at about 300° to about 600° C.

14. A method according to claim 7 wherein said firing is in a vacuum or in an inert atmosphere.

15. A mirror made according to the method of claim 7.

* * * * *